(12) United States Patent
Banerjee et al.

(10) Patent No.: US 9,887,872 B2
(45) Date of Patent: Feb. 6, 2018

(54) HYBRID APPLICATION ENVIRONMENTS INCLUDING HOSTED APPLICATIONS AND APPLICATION SERVERS FOR INTERACTING WITH DATA IN ENTERPRISE ENVIRONMENTS

(75) Inventors: Atanu Banerjee, Hyderabad (IN); Venkatesh Narayanan, Bangalore (IN); Vinay Yadav, Hyderabad (IN); Rajesh Kamath, Hyderabad (IN); Sivashankar Toola, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 13/549,002

(22) Filed: Jul. 13, 2012

(65) Prior Publication Data

US 2014/0019516 A1    Jan. 16, 2014

(51) Int. Cl.
*H04L 29/08* (2006.01)
*G06F 9/54* (2006.01)

(52) U.S. Cl.
CPC ........ *H04L 29/08702* (2013.01); *G06F 9/541* (2013.01); *H04L 29/08738* (2013.01)

(58) Field of Classification Search
CPC ........... H04L 29/08702; H04L 29/0872; H04L 29/08738; H04L 67/1036; H04L 12/00; H04L 12/16; H04L 12/22; H04L 12/66; H04L 29/00; H04L 29/02; H04L 29/08; H04L 29/08576; H04L 29/8738;
(Continued)

(56) References Cited

U.S. PATENT DOCUMENTS 6,067,623 A * 5/2000 Blakley, III ........ G06F 21/6236
                                                    707/999.009
6,304,881 B1 * 10/2001 Halim et al.
(Continued)

FOREIGN PATENT DOCUMENTS

CN         102216731 A    10/2011
KR    1020010041388 A     5/2001
(Continued)

OTHER PUBLICATIONS

Paul Robinson; "Hybrid SharePoint Environments with Office 365;" White Paper; Sep. 2011; pp. 1-25; Microsoft; http://www.fmtconsultants.com/files/2012/02/Hybrid-SharePoint-Environments-with-Office-365.pdf.
(Continued)

*Primary Examiner* — Tauqir Hussain
*Assistant Examiner* — Boris D Grijalva Lobos

(57) ABSTRACT

Disclosed herein are systems, methods, and software for facilitating hybrid application environments. In at least one implementation, an application server within a hosting environment receives a data request initiated by a hosted application within the hosting environment. The hosted application may initiate the data request in response to a page request made on behalf of a hosted identity logged into the hosting environment. The application server generates a hybrid data request based on request information comprising at least a portion of the data request and the hosted identity and directs the hybrid data request over a connection established between the hosting environment and an enterprise environment for handling by an application server within the enterprise environment.

12 Claims, 6 Drawing Sheets

(58) Field of Classification Search
CPC ... H04L 67/00; H04L 67/10; G06F 15/17331; G06F 17/30; G06F 17/30011; G06F 15/00; G06F 15/16; G06F 17/00
USPC .................................. 709/201–203, 217, 219
See application file for complete search history.

(56) References Cited

U.S. PATENT DOCUMENTS

| | | | |
|---|---|---|---|
| 6,415,322 B1* | 7/2002 | Jaye | G06Q 30/02 379/127.01 |
| 6,804,330 B1* | 10/2004 | Jones | H04M 3/4938 379/88.01 |
| 7,039,714 B1* | 5/2006 | Blakley, III | H04L 63/0815 709/229 |
| 7,174,383 B1* | 2/2007 | Biswas et al. | 709/229 |
| 7,320,024 B2* | 1/2008 | Oku | H04L 29/06 709/202 |
| 7,890,084 B1* | 2/2011 | Dudziak et al. | 455/411 |
| 7,941,546 B2* | 5/2011 | Rice et al. | 709/227 |
| 7,971,202 B2* | 6/2011 | Bell et al. | 717/172 |
| 8,095,972 B1* | 1/2012 | Floyd et al. | 726/2 |
| 8,181,206 B2* | 5/2012 | Hasek | 725/58 |
| 8,407,768 B1* | 3/2013 | Hayter | 726/5 |
| 8,713,690 B2* | 4/2014 | Harada | G06Q 20/206 705/26.2 |
| 8,949,968 B2* | 2/2015 | Wei | H04L 63/0272 379/901 |
| 9,015,809 B2* | 4/2015 | Brown | H04W 12/02 709/226 |
| 9,109,917 B2* | 8/2015 | Foster | G01C 21/362 |
| 9,160,693 B2* | 10/2015 | Brown | H04L 51/00 |
| 2001/0034702 A1* | 10/2001 | Mockett | G06Q 20/02 705/39 |
| 2002/0002673 A1* | 1/2002 | Narin | 713/152 |
| 2002/0083057 A1* | 6/2002 | Zulpa et al. | 707/9 |
| 2002/0104006 A1* | 8/2002 | Boate et al. | 713/186 |
| 2002/0132609 A1* | 9/2002 | Lewis et al. | 455/412 |
| 2004/0230791 A1* | 11/2004 | Boebert et al. | 713/150 |
| 2007/0118895 A1* | 5/2007 | Coskun | H04L 63/20 726/15 |
| 2007/0124809 A1* | 5/2007 | Narin | G06F 21/10 726/6 |
| 2007/0130167 A1* | 6/2007 | Day | H04L 29/12594 |
| 2007/0143447 A1* | 6/2007 | Beckum et al. | 709/219 |
| 2007/0233804 A1* | 10/2007 | Palekar et al. | 709/208 |
| 2008/0010086 A1* | 1/2008 | Skelly et al. | 705/2 |
| 2008/0162509 A1* | 7/2008 | Becker | 707/100 |
| 2008/0247320 A1* | 10/2008 | Grah et al. | 370/241 |
| 2008/0248834 A1* | 10/2008 | Chatterjee | G06F 3/1415 455/557 |
| 2008/0281617 A1* | 11/2008 | Conrad et al. | 705/1 |
| 2009/0075697 A1* | 3/2009 | Wilson | A01G 23/04 455/557 |
| 2009/0313620 A1 | 12/2009 | Sedukhin et al. | |
| 2010/0011104 A1* | 1/2010 | Crosbie | 709/226 |
| 2010/0037057 A1* | 2/2010 | Shim | H04L 63/0823 713/171 |
| 2010/0081417 A1* | 4/2010 | Hickie | 455/414.1 |
| 2010/0161976 A1* | 6/2010 | Bacher | 713/164 |
| 2010/0198730 A1* | 8/2010 | Ahmed et al. | 705/50 |
| 2010/0250648 A1* | 9/2010 | Cao et al. | 709/203 |
| 2011/0071996 A1* | 3/2011 | Fisher et al. | 707/705 |
| 2011/0122063 A1* | 5/2011 | Perlman | A63F 13/12 345/161 |
| 2011/0145439 A1* | 6/2011 | Chaturvedi et al. | 709/244 |
| 2011/0208838 A1* | 8/2011 | Thomas et al. | 709/219 |
| 2011/0277027 A1* | 11/2011 | Hayton et al. | 726/8 |
| 2012/0042033 A1 | 2/2012 | Ayala, Jr. et al. | |
| 2012/0079122 A1* | 3/2012 | Brown et al. | 709/227 |
| 2012/0233199 A1* | 9/2012 | Jenkins | H04L 29/08729 707/769 |
| 2012/0278621 A1* | 11/2012 | Woloszyn | 713/168 |
| 2013/0074172 A1* | 3/2013 | Gargaro et al. | 726/8 |
| 2013/0151690 A1* | 6/2013 | Shah et al. | 709/224 |
| 2013/0179985 A1* | 7/2013 | Strassmann | G06F 21/60 726/26 |
| 2013/0274997 A1* | 10/2013 | Chien | G06F 17/00 701/36 |
| 2013/0297668 A1* | 11/2013 | McGrath et al. | 709/201 |
| 2013/0340064 A1* | 12/2013 | Kostiainen | H04L 63/0823 726/10 |
| 2014/0015846 A1* | 1/2014 | Campbell et al. | 345/589 |
| 2014/0059693 A1* | 2/2014 | Stecher | 726/26 |

FOREIGN PATENT DOCUMENTS

| | | |
|---|---|---|
| WO | 02/13007 A1 | 2/2002 |
| WO | 03/034219 A1 | 4/2003 |
| WO | WO 2007065146 A2 * | 6/2007 ............. H04L 29/08 |

OTHER PUBLICATIONS

IBM; "IBM Hybrid Cloud Solution;" Mar. 21, 2012; pp. 1-2; IBM; http://www-01.ibm.com/software/tivoli/products/hybrid-cloud/.

Microsoft; "Understanding Transport in a Hybrid Deployment;" Mar. 16, 2012; pp. 1-3; Microsoft; http://technet.microsoft.com/en-us/library/ff645372.aspx.

Microsoft; "Introduction for Office 365 Administrators;" Mar. 21, 2012; pp. 1-11; Microsoft; http://onlinehelp.microsoft.com/en-us/office365-enterprises/gg524291.aspx.

Azaleos Corporation; "Managed Hybrid Services;" Mar. 21, 2012; pp. 1-2; Azaleos Corporation; Seattle, WA; http://www.azaleos.com/uploads//AZ-Managed%20HybridServices(1).pdf.

MSP1; "Identity and Access Management;" Mar. 21, 2012; p. 1; MSP1; http://www.msp1services.com/microsoft-solutions/identity-and-access-management.

Thomas; "Identity Management: Deploying ADFS in Office 365;" Office 365 Blog; Oct. 11, 2011; pp. 1-7; Office 365; Seattle, WA; http://www.office365advisors.com/identity-management-deploying-adfs-in-office-365/.

Citrix Systems, Inc.; "Citrix OpenCloud Bridge;" White Paper; Mar. 21, 2012; pp. 1-10; Citrix Systems, Inc.; Fort Lauderdale, FL; http://www.citrix.com/site/resources/dynamic/salesdocs/citrix_opencloud_bridge.pdf.

Andre Kieft; "SharePoint Online in a Hybrid Environment;" Jan. 11, 2012; pp. 1-2; http://blogs.technet.com/b/akieft/archive/2012/01/11/sharepoint-online-in-a-hybrid-environment.aspx.

"International Search Report & Written Opinion for PCT Patent Application No. PCT/US2013/049414", dated Nov. 7, 2013, Filed Date: Jul. 5, 2013, 8 Pages.

"First Office Action and Search Report Issued in Chinese Patent Application No. 201380037404.1", dated Jun. 2, 2017, 15 Pages.

* cited by examiner

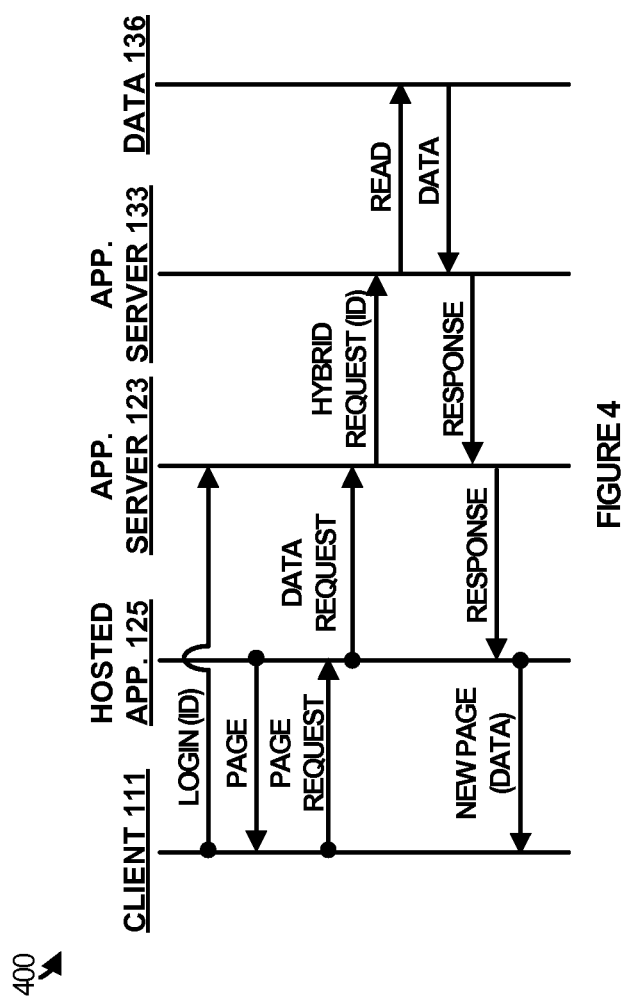

HYBRID APPLICATION ENVIRONMENTS INCLUDING HOSTED APPLICATIONS AND APPLICATION SERVERS FOR INTERACTING WITH DATA IN ENTERPRISE ENVIRONMENTS

TECHNICAL FIELD

Aspects of the disclosure are related to computer hardware and software technologies, and in particular, to application hosting technologies and environments.

TECHNICAL BACKGROUND

Many software applications and services are provisioned within hosting environments that support multiple tenancies. The hosting environments include infrastructure and management components that allow parties to establish a tenancy with ease. The tenants can install and run applications from within the hosting environment. Client components communicatively coupled with the hosting environment engage with the hosted applications in order to provide application services to end users having hosted identities.

For example, an enterprise may develop a contacts management application for installation within a hosting environment with which the enterprise has established a tenancy. Users associated with the enterprise, by way of a web browsing application or other suitable interface, engage with the contacts management application through the hosting application. The contacts application is served to the end users from the application servers within the hosting application. In addition, associated data and other information are sometimes stored within the hosting environment.

Not all applications or data have been migrated to the provisioning model described above. Rather, many applications are installed on application servers residing within enterprise environments that are generally access restricted. In addition, the associated data and other information, with which the applications may interact, may reside within the enterprise environment and may be accessed only via the enterprise environment. Users typically gain access to these applications and associated data using enterprise identities.

OVERVIEW

Provided herein are systems, methods, and software for facilitating hybrid application environments. In at least one implementation, an application server within a hosting environment receives a data request initiated by a hosted application within the hosting environment. The hosted application may initiate the data request in response to a page request made on behalf of a hosted identity logged into the hosting environment. The application server generates a hybrid data request based on request information comprising at least a portion of the data request and the hosted identity and directs the hybrid data request over a connection established between the hosting environment and an enterprise environment for handling by an application server within the enterprise environment.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates an operational sequence in an implementation.

TECHNICAL DISCLOSURE

Implementations described herein provide for improved application environments allowing for hybrid scenarios whereby an application hosted within a hosting environment may be able to interact with or otherwise obtain data generally accessible via an enterprise environment.

In at least one implementation, a connection is established between a hosting environment and an enterprise environment. A hosted application installed within the hosting environment and hosted on an application server therein initiates data requests. The application server generates hybrid requests for fulfillment or resolution by an application server within the enterprise environment. The hybrid requests are communicated to the enterprise environment over the established connection.

Figure 1:
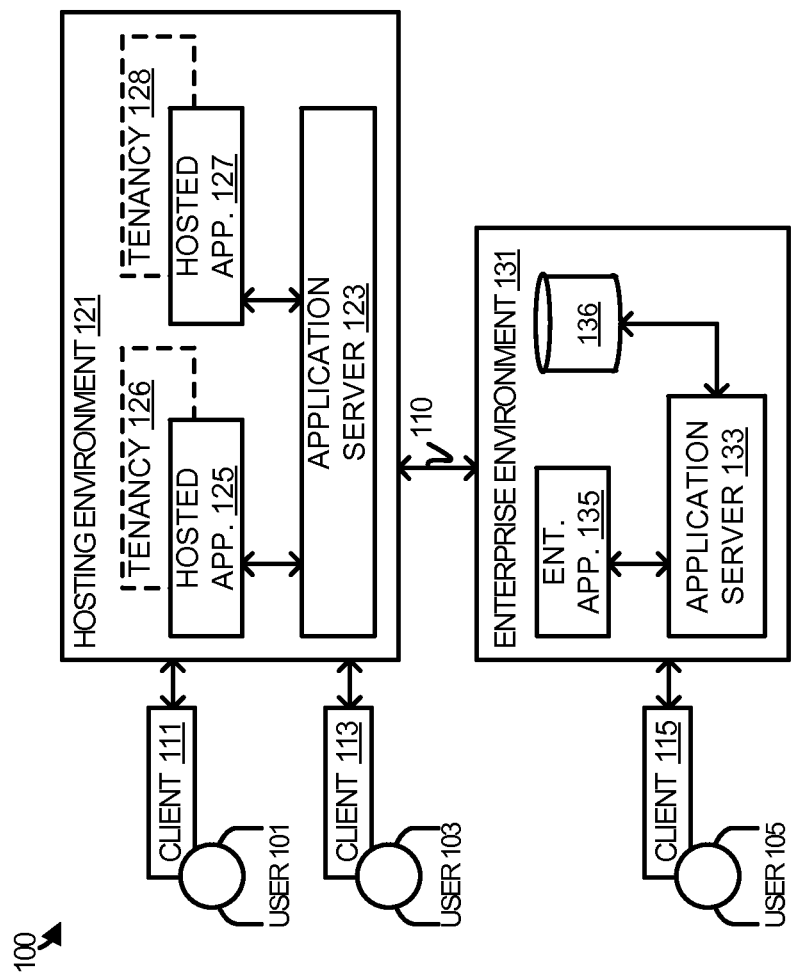
FIG. 1 illustrates a hybrid environment in an implementation.

FIG. 1 illustrates hybrid environment 100 in an implementation. Hybrid environment 100 involves users 101, 103, and 105, operating clients 111, 113, and 115 respectively, engaging with hosting environment 121 and enterprise environment 131. In particular, user 101 operating client 111 and user 103 operating client 113 are engaged with hosting environment 121. User 105 operating client 115 is engaged with enterprise environment 131.

Hosting environment 121 includes application server 123, hosted application 125, and hosted application 127. Application server 123 may be any server system, virtual server system, server software, or combination or variation thereof capable of hosting applications, such as hosted application 125 and hosted application 127. Hosted application 125 may be any application capable of being installed within hosting environment 121 and hosted by application server 123 on behalf of or in association with tenancy 126. Similarly, hosted application 127 may be any application capable of being installed within hosting environment 121 and hosted by application server 123 on behalf of or in association with tenancy 128. Hosting environment 121 may include additional application servers, hosted applications, or other elements. Hosting environment 121 may be implemented within a facility or facilities suitable for hosting applications, such as a data center.

Enterprise environment 131 includes application server 133, enterprise application 135, and data store 136. Application server 133 may be any server system, virtual server system, server software, or combination or variation thereof capable of hosting applications, such as enterprise application 135. Enterprise application 135 may be any application capable of being installed within enterprise environment 131 and being hosted by application server 133. Data store 136 may be any data store, collection of data, or other information accessible by enterprise application 135. While illustrated as residing within enterprise environment 131, data store 136 may be external to enterprise environment but accessed through enterprise environment 131.

Clients 111 and 113 may be any client devices, client software, or combination or variation thereof capable of interfacing between hosting environment 121 and users 101 and 103 respectively. Client 115 may be any client device, client software, or combination or variation thereof capable of interfacing between enterprise environment 131 and user 105. Examples of client devices include desktop computers, laptop computers, tablet computers, Internet appliances, gaming devices, workstations, mobile phones, smart phones, media players, and personal digital assistants, as well any other type of device capable of being communicatively coupled with application servers and applications. Examples of client software include web browsing applications and productivity applications, communication applications, and gaming applications, as well as any other type of software capable of being communicatively coupled with application servers and applications.

Note that while clients 111 and 113 are depicted as engaged with hosting environment 121, clients 111 and 113 may be capable of engaging with enterprise environment 131. Similarly, while client 115 is depicted as engaged with enterprise environment 131, client 115 may be capable of engaging with hosting environment 121.

In operation, users generally access hosting environment 121 using hosted identities, while users generally access enterprise environment 131 using enterprise identities that are different than the hosted identities. In some implementations, users may have multiple identities. For example, a user may have a hosted identity with which the users accesses hosting environment 121. Hosting environment 121 may include various credentialing or authentication elements and capabilities to authenticate the user based on his or her hosted identity. The same user may also have an enterprise identity with which the user may access enterprise environment 131. Enterprise environment 131 may also include various credentialing or authentication elements and capabilities to authenticate the user based on his or her enterprise identity.

In one possible implementation, user 101 may be associated with tenancy 126. For example, an enterprise may engage with hosting environment 121 to establish tenancy 126. Tenancy 126 allows for the installation and hosting of applications associated with the enterprise. Tenancy 126 also allows for associations between users, identified by hosted identities, and the applications and other resources provisioned under the tenancy. Upon engaging with hosting environment 121, using client 111, user 101 may provide his or her hosted identity in order to gain access to the various resources associated with tenancy 126, such as hosted application 125.

In a possible variation, user 103 may be associated with tenancy 128. For example, another enterprise may engage with hosting environment 121 to establish tenancy 128. Tenancy 128 allows for the installation and hosting of applications associated with the other enterprise. Tenancy 128 may also allow for associations between users, identified by hosted identities, and the applications and other resources provisioned under the tenancy. Upon engaging with hosting environment 121, using client 113, user 103 may provide his or her hosted identity in order to gain access to the various resources associated with tenancy 128, such as hosted application 127.

Note that the enterprise that establishes tenancy 126 may be a different enterprise than the other enterprise that establishes tenancy 128. In addition, note that hosting environment 121 may be capable of established any number of tenancies with any number of enterprises. The tenancy model is well known in the art and need not be discussed at length here.

However, in at least some implementations, the enterprise that establishes tenancy 126 may be the same enterprise associated with enterprise environment 131. In such an implementation, the enterprise may desire to host some applications, such as hosted application 125, within hosting environment 121. Those hosted applications may be accessible to users linked to the enterprise by way of their hosted identities that grant them with access to hosted environment 121.

In addition, the enterprise may desire for hosted application 125 to be able to access data and possibly other resources within enterprise environment 131. To accomplish this, a connection 110 may be established between hosting environment 121 and enterprise environment 131 over which hybrid requests, discussed in more detail below, may be communicated. The connection 110 may be established concurrent with or generally when hosted application 125 is installed. Optionally, the connection 110 may be established prior to installing hosted application 125. Rather, during the installation process it may be possible to specify that data requests initiated by hosted application 125 be routed to enterprise environment 131 over the connection 110. Such a configuration may also be accomplished after having installed hosted application 125. In other words, the handling of data requests for hosted application 125 may be a configurable setting that can be dynamically changed or adjusted. The connection 110 may be a logical connection, a virtual connection, a physical connection, or any combination or variation thereof. The connection 110 may comprise a variety of links, equipment, and other elements capable of facilitating the exchange of communications between hosting environment 121 and enterprise environment 131, as discussed herein. Such connections are generally well understood in the art and need not be discussed at length here.

Hosted application 127 may be configured differently than hosted application 125. For example, whereas data requests initiated by hosted application 125 may be routed to enterprise environment 131, data requests initiated by hosted application 127 may be handled internally by hosting environment 121. In an implementation, data associated with hosted application 127 may be stored and hosted within hosting environment 121. In another implementation, hosted application 127 may be configured so that data requests are routed to another enterprise environment different than enterprise environment 131.

The data requests initiated by hosted application 125 and hosted application 127 discussed above may be made in response to page requests generated by clients 111 and 113. The page requests may be, for example, web page requests for a page served by hosted application 125 or hosted application 127. Other types of requests are possible, such as requests for information or data displayed by way of a web page or some other suitable data structure. Upon receiving the requests, hosted application 125 and hosted application 127 communicate data requests to application server 123.

Depending upon the configurable information associated with each hosted application, application server 123 may serve the data requests using data hosted internally to hosting environment 121 or by way of communication with enterprise environment 131 over the previously established connection 110.

Figure 2:
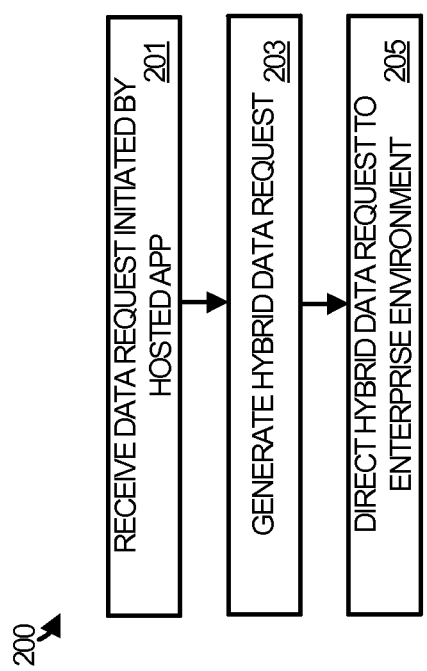
FIG. 2 illustrates a hybrid process in an implementation.

FIG. 2 illustrates a particular hybrid process 200 for handling data requests within application server 123. To begin, application server 123 receives a data request initiated by a hosted application, such as hosted application 125 (step 201). The data request may be initiated by the hosted application in response to a page request made on behalf of a hosted identity logged into hosting environment 121. Next, application server 123 generates a hybrid data request based on request information comprising at least a portion of the data request and the hosted identity (step 203). Application server 123 directs the hybrid data request over the connection 110 established between hosting environment 121 and enterprise environment 131 for handling by application server 133 within enterprise environment 131 (step 205). Application server 133 may, for example, retrieve data from a data store 136 or some other data store within or external to enterprise environment 131 and responsively reply to the hybrid data request with the data. Application server 123 may then provide the data to hosted application 125. In turn, hosted application 125 can provide the data for presentation by a client associated with the hosted identity, such as client 111.

In one implementation, the hybrid data request may identify user 101 by his or her hosted identity. Optionally, user 101 may be identified by a token or some other technique suitable for identifying user 101 to enterprise environment 131 such that user 101 may be authenticated or otherwise validated for access to enterprise environment 131. In some implementations, the mapping of the users hosted identity to the users enterprise identity is done by way of a user profile mapping service. Establishing which hosted identities may have access to enterprise environment 131 may be part of the installation process for hosted application 125, or part of some other post-installation process for facilitating a hybrid scenario.

In one implementation, a variation of hybrid process 200 may be employed by application server 133 within enterprise environment 131. Client 115, associated with user 105 logged into enterprise environment 131 under an enterprise identity, requests a page from enterprise application 135. Enterprise application 135 responsively makes a data request to application server 133. In this variation, configuration information for enterprise application 135 may be set such that data requests made by enterprise application 135 are directed to hosting environment 121. Accordingly, application server 133 may generate a hybrid request for communication over the connection 110 between enterprise environment 131 and hosting environment 121. Application server 123 can serve the hybrid request by, for example, retrieving or otherwise obtaining data hosted within hosted environment 121. The retrieved data can be returned to application server 133 by way of the connection 110 and presented by enterprise application 135 to client 115.

Figure 3:
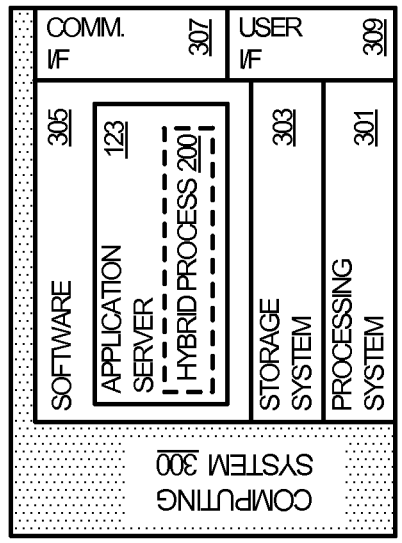
FIG. 3 illustrates a computing system in an implementation.

Referring now to FIG. 3, a computing system suitable for implementing a hybrid process is illustrated. Computing system 300 is generally representative of any computing system or systems on which hybrid process 200 may be suitably implemented. Optionally, computing system 300 may also be suitable for implementing application server 123 or application server 133. Indeed, computing system 300 may also be suitable for implementing any elements of hosting environment 520 or enterprise environment 530 provided in FIG. 5. Examples of computing system 300 include server computers, client computers, virtual machines, distributed computing systems, and Internet appliances, as well as any combination or variation thereof. Computing system 300 is discussed in more detail below.

FIG. 4 illustrates an operational sequence 400 pertaining to one implementation of hybrid process 200. In this implementation, user 101 logs into hosting environment 121. Client 111 communicates an identifier (ID) representative of a hosted identity for user 101 to application server 123. It can be appreciated that, while application server 123 may authenticate or otherwise authorize user 101, other elements included within or provided separately from application server 123 may perform such authentication and authorization functions. Once logged into hosting environment 121, user 101 may proceed to engage with the various applications and service available thereon, such as hosted application 125.

While engaged with hosted application 125, a page may be served to client 111 for rendering and presentation to user 101. As user 101 interacts with the page or pages, client 111 may communicate page requests, or other types of requests, to hosted application 125. Hosted application 125, responsive to the page request, communicates a data request to application server 123. For example, the page request may be a request to view a set of data and the data request may be a request for the set of data.

Application server 123 receives the data request and generates a hybrid request. The hybrid request identifies the hosted identity associated with user 101 and references the requested data. Application server 123 communicates the hybrid request to application server 133 over the connection 110 established there between. Application server 133 communicates with data store 136 to read or otherwise retrieve the requested data. Application server 133 provides a response to application server 123, including the request data. Application server 123 responds to hosted application 125 with the request data which, in turn, presents a new page to client 111 with the data. For example, a web page with the requested data imbedded or otherwise included therein may be delivered to client 111 for presentation to user 101.

Figure 5:
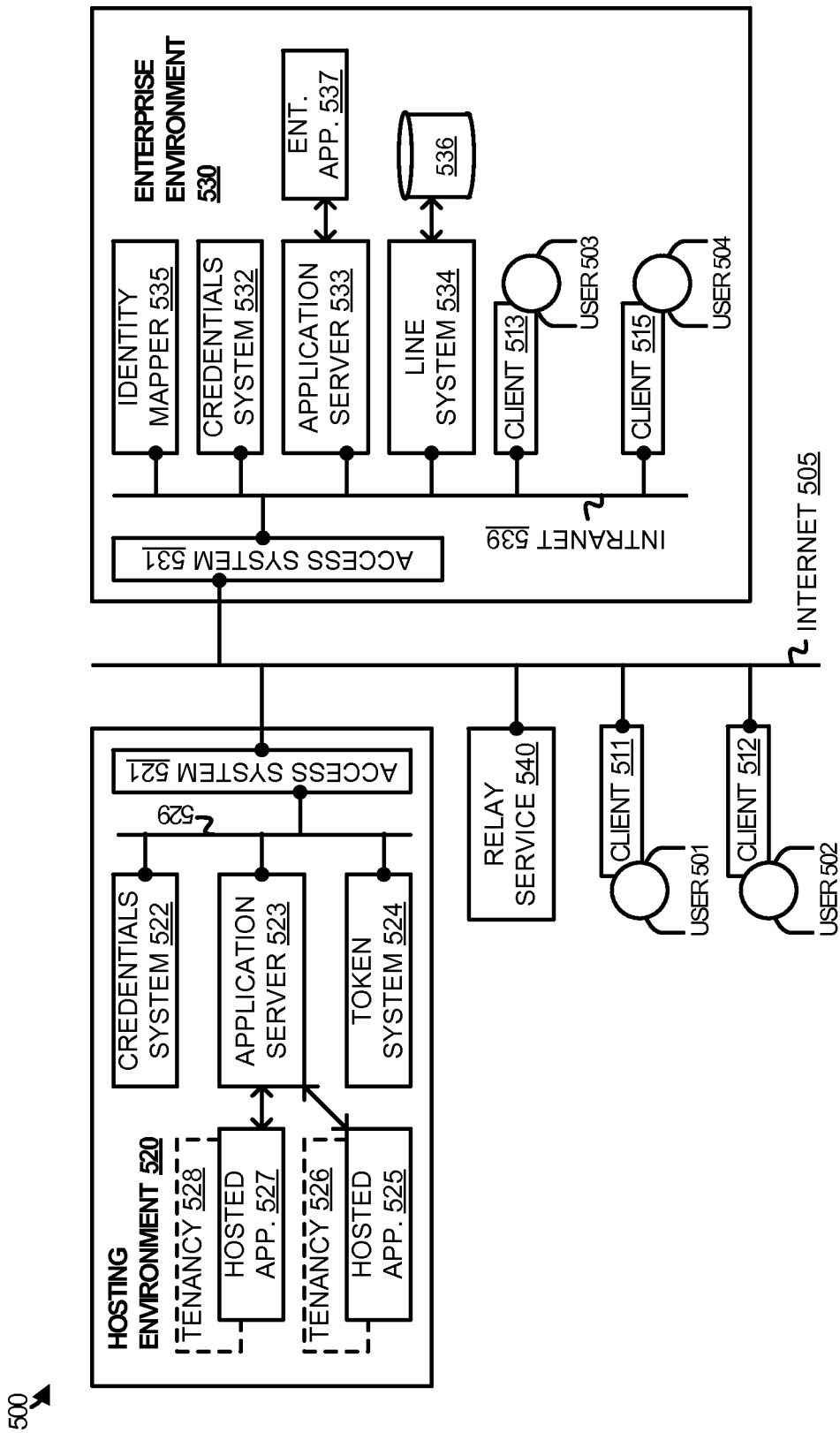
FIG. 5 illustrates a hybrid environment in an implementation.

FIG. 5 illustrates hybrid environment 500 in an implementation. Hybrid environment 500 includes hosting environment 520, enterprise environment 530, and optionally relay service 540. Users 501 and 502, utilizing clients 511 and 512 respectively, may engage with hosting environment 520 in order to gain access to and use hosted applications 525 and 527, as will be discussed in more detail below. Users 503 and 504, utilizing clients 513 and 515 respectively, may engage with enterprise environment 530 in order to gain access to and use enterprise application 537. It should be understood that users 501 and 502 are not limited to engaging with hosting environment 520, nor are users 501 and 502 limited to engaging with only on tenancy. Likewise, users 503 and 504 are not limited to engaging with enterprise environment 530. Rather, users 501 and 502 may engaged with enterprise environment 530 or some other environment not shown, while users 503 and 504 may also engage with hosting environment 520.

Hosting environment 520 includes access system 521, credentials system 522, application server 523, and token system 524. Application server 523 may include or provide hosted application 525, associated with tenancy 526, and hosted application 527, associated with tenancy 528. Credentials system 522 may be any system or collection of systems capable of providing service credentials for hosting environment 520. Token system 524 may be any system capable of providing user credentials on behalf of a user, such as a token, to enterprise environment 530. Application server 523 may be any system or collection of systems capable of hosting hosted applications 525 and 527, providing various other hosted services, and interfacing with enterprise environment 530. Access system 521 may be any system or collection of systems capable of providing access to hosting environment 520 and Internet 505.

Enterprise environment 530 includes access system 531, credentials system 532, application server 533, line system 534, and identity mapper 535. Application server 533 may include or otherwise provide enterprise application 537. Line system 534, sometimes referred to as a line of business system, includes or provides access to data store 536. Intranet 539 provides intercommunication capability for the exchange of communications among the aforementioned elements, including clients 513 and 515, operated by users 503 and 504 respectively. Credentials system 532 may be any system or collection of systems capable of providing credentials on behalf of users or systems in order for the systems or users to gain access to, possibly, application server 533 and/or line system 534. Line system 534 may be any system or collection of systems capable of providing business applications, such as enterprise service applications. While line system 534 is depicted as internal to enterprise environment 530, line system 534 may possibly be provisioned external to enterprise environment 530. Enterprise application 537 may be any application or collection of applications hosted by application server 533. Application server 533 may be any system or collection of systems capable of hosting enterprise application 537.

In operation, an enterprise may provide some applications by way of hosting environment 520, while providing others by way of enterprise environment 530. Hosting environment 520 allows for multiple enterprises or entities to establish tenancies. The enterprises may then install or otherwise provision various resources, including data and applications, within hosting environment 520. Users can login to hosting environment 520, possibly using a hosted identity, to access their resources accordingly. Hosting environment 520 is generally accessible over Internet 505 using any number and variety of communication devices and appliances.

With respect to FIG. 5, a first enterprise may establish tenancy 526 within hosting environment 520 in order to provide hosted application 525 to users associated with the first enterprise. For illustrative purposes it will be assumed that user 501 is associated with the first enterprise. In addition, it will be assumed that the first enterprise is associated with enterprise environment 530. A second enterprise, different and distinct from the first enterprise, may establish tenancy 528 within hosting environment 520 in order to provide hosted application 527 to users associated with the second enterprise. For illustrative purposes it will be assumed that user 502 is associated with the second enterprise. When logged into hosting environment 520, user 501 is provided with access to hosted application 525, while user 502 is provided with access to hosted application 527. Users 501 and 502 may gain access using hosted identities that can be authenticated and verified by enterprise environment 520.

Application server 523 generally executes hosted applications 525 and 527 in order to provide application experiences or environments to clients 511 and 512. For example, application server 523 may service web pages or other content to clients 511 and 512 for presentation to users 501 and 502. Other hosting functions are possible. Clients 511 and 512 may communicate requests and other commands to application server 523 to allow users 501 and 502 to navigate or otherwise interact with hosted applications 525 and 527.

At times, user 501 may make a request, via client 511, that implicates enterprise environment 530. For example, user 501 may navigate to a page or data that is stored within data store 536. The page request may prompt hosted application 525 to initiate a data request to application server 523. Application server 523 handles the data request by communicating with enterprise environment 530 to obtain the data relevant to the request.

Figure 6:
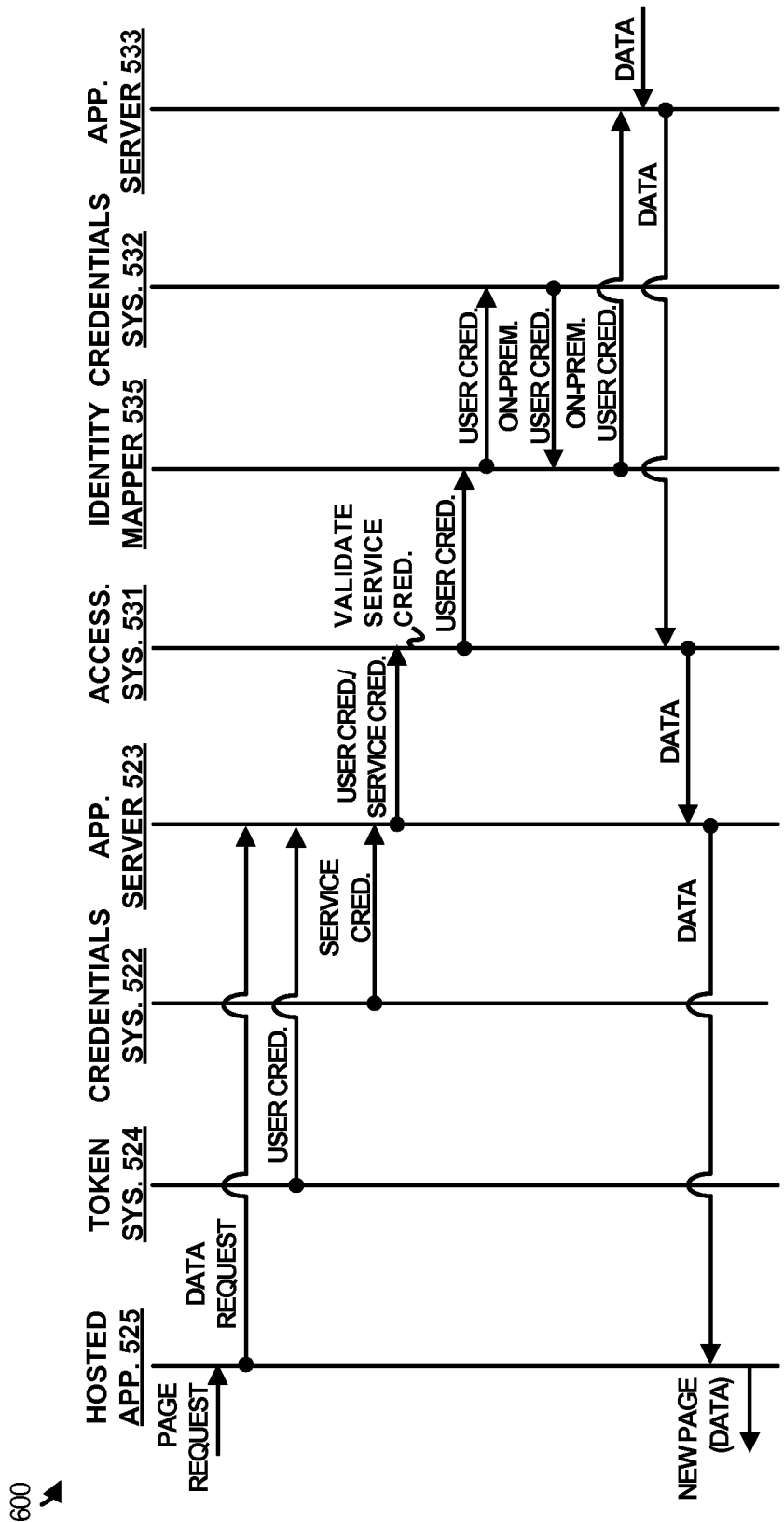
FIG. 6 illustrates an operational sequence in an implementation.
Figure 7:
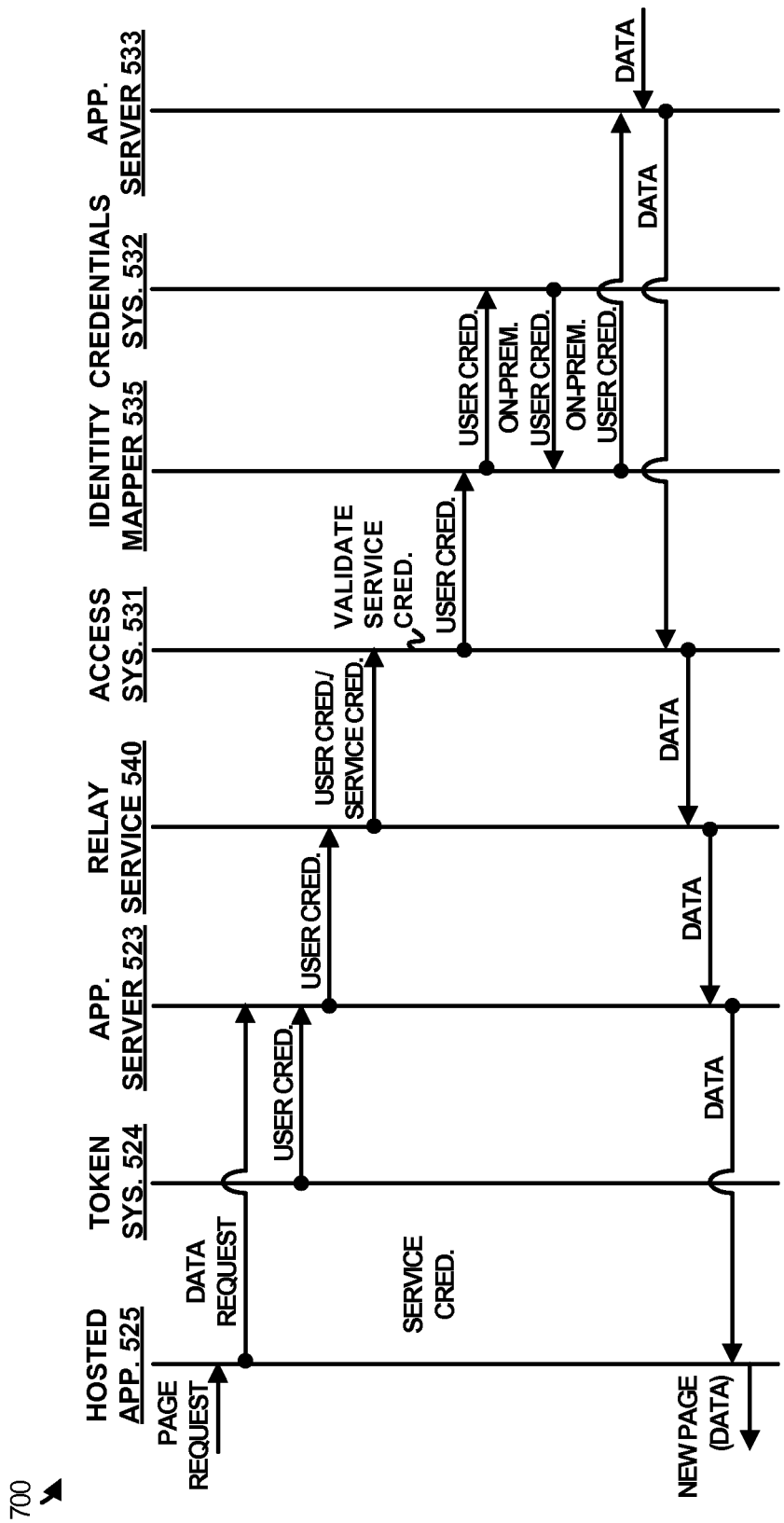
FIG. 7 illustrates an operational sequence in an implementation.

FIGS. 6-7 illustrates two example operational sequences pertaining to various ways in which application server 523 may engage with enterprise environment 530 in order to obtain and serve the relevant data. In FIG. 6, a first implementation is provided whereby application server 523 is capable of providing user credentials and service credentials to enterprise environment 530. In FIG. 7, a second implementation is provided whereby relay service 540 provides service credentials to enterprise environment 530.

Turning to FIG. 6, hosted application 525 receives a page request from, for example, client 511. Hosted application 525 communicates a corresponding data request to application server 523 requesting data or other content relevant to the page request. Token system 524 provides user credentials, such as a token, to application server 523. This may occur prior to, simultaneously with, or after the data request made by hosted application 525. Credentials system 522 provides service credentials to application server 523.

Application server 523 then generates a hybrid data request for communication and delivery to enterprise environment 530. The hybrid data request, in addition to identifying the data request, also includes the user credentials and service credentials. Access system 531 receives the hybrid request and performs validation on the service credentials. Once the service validation is complete, access system 531 provides the user credentials to identity mapper 535.

Identity mapper 535 receives the user credentials and maps the hosted identity of user 501 to an enterprise identity for user 501. Identity mapper 535 may communicate with credentials system 532 in order to obtain on-premises credentials for user 501 based on the enterprise identity for user 501. Having obtained the on-premises credentials, identity mapper 535 communicates the on-premises credentials to application server 533. Application server 533 communicates with data store 536, possibly via line system 534, in order to retrieve the data relevant to the original data request made by client 511. The data is communicated back through access system 531 and application server 523 to hosted application 525. Hosted application 525 can then generate a new page for communication to and display by client 511.

Turning to FIG. 7, hosted application 525 receives a page request from, for example, client 511. Hosted application 525 communicates a corresponding data request to application server 523 requesting data or other content relevant to the page request. Token system 524 provides user credentials, such as a token, to application server 523. This may occur prior to, simultaneously with, or after the data request made by hosted application 525.

In this implementation, credentials system 522 does not provide service credentials to application server 523. Rather, applications server 523 communicates the user credentials provided by token system 524 to relay service 540. A corresponding data request may also be provided to relay service 540 by application server 523. Relay service 540 then provides the user credentials and the service credentials to access system 531.

Access system 531 receives the hybrid request and performs validation on the service credentials. Once the service validation is complete, access system 531 provides the user credentials to identity mapper 535. Identity mapper 535 receives the user credentials and maps the hosted identity of user 501 to an enterprise identity for user 501. Identity mapper 535 may communicate with credentials system 532 in order to obtain on-premises credentials for user 501 based on the enterprise identity for user 501.

Having obtained the on-premises credentials, identity mapper 535 communicates the on-premises credentials to application server 533. Application server 533 communicates with data store 536, possibly via line system 534, in order to retrieve the data relevant to the original data request made by client 511. The data is communicated back through access system 531, relay service 540, and application server 523 to hosted application 525. Hosted application 525 can then generate a new page for communication to and display by client 511.

In a brief illustrative scenario, an application server is provided within a hosting environment to facilitate a hybrid application environment. The application server receives data requests initiated by hosted applications within the hosting environment. To respond to the data requests, the application server selectively engage with one of at least a hosted data source within the hosting environment and an enterprise data source within an enterprise environment based on configurable handling information associated with the hosted applications. To engage with the enterprise data source within the enterprise environment, the application server generates hybrid data requests for enterprise data based on the data requests and hosted identities associated with the data requests. The application server directs the hybrid data requests to the enterprise environment.

In some implementations, the application server may also render a configuration menu for presentation during installation of the hosted applications. The configurable handling information can be input or otherwise received through the configuration menu.

In another illustrative scenario, a hybrid environment may be facilitated by the SharePoint® hosting environment, provided by Microsoft®. In this scenario, it may be possible to connect services running in both an on-premises SharePoint® server as well as through SharePoint® Online, sometimes referred to as in the cloud, in order to create a single logical service or application that spans cloud and on-premises, but presents to the user a single logical interface with shared data and logic.

As an example, a SharePoint® application server may include or be enabled for Business Connectivity Services (BCS). This service may also be enabled in SharePoint® Online. Customers may have the choice of using the BCS service either on-premises, or in SharePoint®. The on-premises BCS service and the BCS service in SharePoint® Online may communicate with each other in order to deliver connectivity scenarios between SharePoint® Online and other on-premises line-of-business systems (e.g. SAP).

A number of scenarios may be enabled by the aforementioned connectivity. In one scenario, a user may navigate to a page in SharePoint® Online, while data for the page is retrieved data from the on-premises LOB system in real time. In another scenario, batch jobs may synchronize documents, roles, tasks, and user profiles, as well as other information, from the on-premises LOB system to SharePoint® Online. In yet another scenario, a user in a hosting environment may search for documents or other content within an enterprise environment.

In one scenario, an application server that provides at least a portion of the SharePoint® Online service, is implemented using one or more computer readable media having stored thereon program instructions for facilitating a hybrid application environment. The program instructions may include first program instructions that, when executed by a computing system, direct the computing system to process a data request, initiated by a hosted application within the hosting environment in response to a page request made on behalf of a hosted identity logged into the hosting environment, to generate a hybrid data request based on request information comprising at least a portion of the data request and the hosted identity. The computing system may also direct the hybrid data request over a connection established between the hosting environment and an enterprise environment for handling by a second application server within the enterprise environment.

The first program instructions may also direct the computing system to, responsive to a second data request initiated by a second hosting application within the hosting environment in response to a second page request made on behalf of the hosted identity logged into the hosting environment, retrieve second data from a hosted data source within the hosting environment. The first program instructions may also direct the computing system to render a configuration menu for presentation during installation of the hosted application and receive configurable handling information input through the configuration menu specifying for data requests initiated by the hosted application to be directed to the enterprise environment. The first program instructions may also further direct the first application server to render a second configuration menu for presentation during installation of the second hosted application and receive second configurable handling information input through the second configuration menu specifying for second data requests initiated by the second hosted application to be handled within the hosting environment.

In another scenario, the program instructions may include second program instructions for implementing a SharePoint® application server within an enterprise environment. The second program instructions, when executed by a second computing system, direct the second computing system to process a second data request, initiated by an enterprise application within the enterprise environment in response to a second page request made on behalf of the enterprise identity logged into the enterprise environment, to generate a second hybrid data request based on second request information comprising the second data request and the hosted identity associated with the enterprise identity. The second computing system may also direct the second hybrid data request over the connection established between the hosting environment and the enterprise environment for handling by the first application server within the hosting environment.

Referring back to FIG. 3, computing system 300 includes processing system 301, storage system 303, software 305, and communication interface 307. Computing system 300 also includes user interface 309, although this is optional. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for hybrid process 200. Computing system 300 may optionally include additional devices, features, or functionality not discussed here for purposes of brevity and clarity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations of processing devices, or variations thereof.

Storage system 303 may comprise any storage media readable by processing system 301 and capable of storing software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or subsystems. Storage system 303 may comprise additional elements, such as a controller, capable of communicating with processing system 301.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 305 may be implemented in program instructions and among other functions may, when executed by computing system 300, direct computing system 300 to receive data requests initiated by hosted applications within a hosting environment; to respond to the plurality of data requests, selectively engage with one of at least a hosted data source within the hosting environment and an enterprise data source within an enterprise environment based on configurable handling information associated with the hosted applications; and to engage with the enterprise data source within the enterprise environment, generate hybrid data requests for enterprise data based on the data requests and hosted identities associated with the data requests and direct the hybrid data requests to the enterprise environment.

Software 305 may include additional processes, programs, or components, such as operating system software or other application software. Software 305 may also comprise firmware or some other form of machine-readable processing instructions capable of being executed by processing system 301.

In general, software 305 may, when loaded into processing system 301 and executed, transform processing system 301, and computing system 300 overall, from a general-purpose computing system into a special-purpose computing system customized to facilitate hybrid scenarios as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein. For example, software 305 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing system with which software 305 is deployed and executed in order to implement hybrid process 200 and optionally application server 123 or application server 133. However, computing system 300 may also represent any computing system on which software 305 may be staged and from where software 305 may be distributed, transported, downloaded, or otherwise provided to yet another computing system for deployment and execution, or yet additional distribution.

Referring again to FIG. 1, through the operation of computing system 300 employing software 305, transformations may be performed with respect to hybrid application environment 100. As an example, a data request initiated by hosted application 125 may be considered transformed from one state to another when subject to hybrid process 200. In a first state, the data request is initiated by hosted application 125. Upon receiving the data request, application server 123 generates a hybrid data request, thereby changing hybrid application environment 100 to a second, different state.

Referring again to FIG. 3, communication interface 307 may include communication connections and devices that allow for communication between computing system 300 and other computing systems not shown over a communication network or collection of networks. Examples of connections and devices that together allow for inter-system communication include network interface cards, antennas, power amplifiers, RF circuitry, transceivers, and other communication circuitry. The aforementioned network, connections, and devices are well known and need not be discussed at length here.

User interface 309, although optional, may include a mouse, a voice input device, a touch input device for receiving a gesture from a user, a motion input device for detecting non-touch gestures and other motions by a user, and other comparable input devices and associated processing elements capable of receiving user input from a user. Output devices such as a display, speakers, printer, haptic devices, and other types of output devices may also be included in user interface 309. The aforementioned user input devices are well known in the art and need not be discussed at length here.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of facilitating a hybrid application environment, the method comprising:
   in a first application server within a hosting environment, receiving a data request initiated by a hosted application hosted on the first application server within the hosting environment in response to a page request made on behalf of a hosted identity external to and logged into the hosting environment in order to gain access to the hosted application;
   in the first application server, generating a hybrid data request based on request information comprising at least a portion of the data request and the hosted identity;
   in the first application server, directing the hybrid data request over a connection established between the hosting environment and an enterprise environment for handling by a second application server within the enterprise environment;
   in the second application server, handling the hybrid data request using on-premises credentials;
   in the second application server, receiving a second data request initiated by an enterprise application within the enterprise environment in response to a second page request made on behalf of the enterprise identity logged into the enterprise environment;
   in the second application server, generating a second hybrid data request based on second request information comprising the second data request and the hosted identity associated with the enterprise identity; and
   in the second application server, directing the second hybrid data request over a connection established between the hosting environment and the enterprise environment for handling by the first application server within the hosting environment.

2. The method of claim 1 further comprising:
   in the first application server, receiving a second data request initiated by a second hosting application within the hosting environment in response to a second page request made on behalf of the hosted identity logged into the hosting environment; and
   in the first application server, handling the second data request by retrieving second data from a hosted data source within the hosting environment.

3. The method of claim 1, wherein the hybrid data request further comprises user credentials, further comprising:
   in the second application server, mapping the hosted identity to an enterprise identity using the user credentials;
   in the second application server, obtaining the on-premises credentials based on the enterprise identity.

4. The method of claim 3 wherein handling the hybrid data request comprises retrieving data from an enterprise data source accessible through the enterprise environment using the enterprise identity.

5. The method of claim 4 wherein handling the hybrid data request comprises generating a hybrid data reply to the hybrid data request comprising the data retrieved from the enterprise data source.

6. The method of claim 5 further comprising, in the hosted application, generating a response to the page request for delivery to a web browsing application that originated the page request, wherein the response comprises a web page including the data retrieved from the enterprise data source.

7. The method of claim 1 wherein handling the second hybrid data request comprises retrieving second data from a hosted data source accessible through the hosting environment using the hosted identity.

8. The method of claim 7 wherein handling the second hybrid data request 4 comprises generating a second hybrid data reply to the second hybrid data request comprising the second data retrieved from the hosted data source.

9. One or more storage devices having stored thereon program instructions for facilitating a hybrid application environment, the program instructions comprising:
   first program instructions that, when executed by a computing system direct the computing system to:
   process a data request, initiated by a hosted application hosted on a first application server within a hosting environment in response to a page request made on behalf of a hosted identity external to and logged into the hosting environment in order to gain access to the hosted application, to generate a hybrid data request based on request information comprising at least a portion of the data request and the hosted identity;
   direct the hybrid data request over a connection established between the hosting environment and an enterprise environment for handling by a second application server within the enterprise environment;
   handle the hybrid data request using on-premises credentials;
   receive in the second application server a second data request initiated by an enterprise application within the enterprise environment in response to a second page request made on behalf of an enterprise identity logged into the enterprise environment;
   generate in the second application server a second hybrid data request based on second request information comprising the second data request and the hosted identity associated with the enterprise identity; and
   direct in the second application server the second hybrid data request over the connection established between the hosting environment and the enterprise environment for handling by the first application server within the hosting environment.

10. The one or more storage devices of claim 9 wherein the first program instructions further direct the computing system to, responsive to a second data request initiated by a second hosted application within the hosting environment in response to a second page request made on behalf of the hosted identity logged into the hosting environment, retrieve second data from a hosted data source within the hosting environment.

11. The one or more storage devices of claim 10 wherein the first program instructions further direct the computing system to render a configuration menu for presentation during installation of the hosted application and receive configurable handling information input through the configuration menu specifying for data requests initiated by the hosted application to be directed to the enterprise environment.

12. The one or more storage devices a of claim 11 wherein the first program instructions further direct the first application server to render a second configuration menu for presentation during installation of the second hosted application and receive second configurable handling information input through the second configuration menu specifying for second data requests initiated by the second hosted application to be handled within the hosting environment.

\* \* \* \* \*